H. A. COVEY.
TRANSMISSION MECHANISM.
APPLICATION FILED DEC. 26, 1913.
1,178,134.
Patented Apr. 4, 1916.
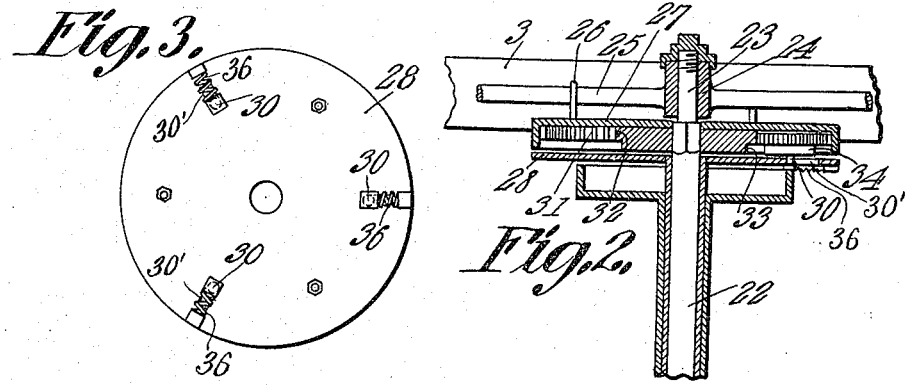
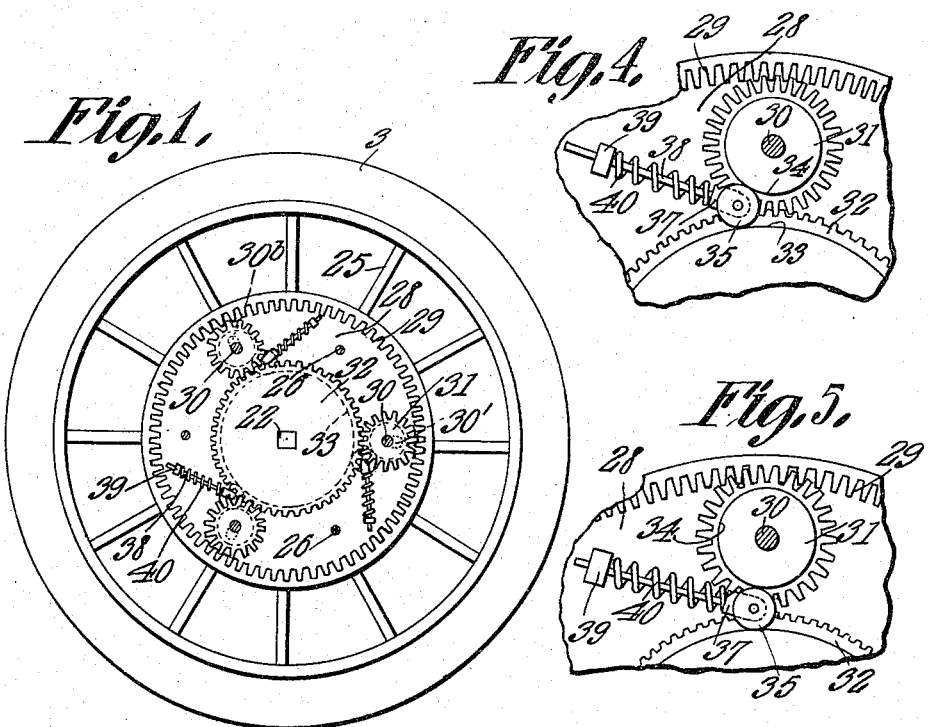
H. A. Covey, Inventor

UNITED STATES PATENT OFFICE.

HARRY A. COVEY, OF EAST AKRON, OHIO.

TRANSMISSION MECHANISM.

1,178,134. Specification of Letters Patent. Patented Apr. 4, 1916.

Application filed December 26, 1913. Serial No. 808,865.

*To all whom it may concern:*

Be it known that I, HARRY A. COVEY, a citizen of the United States, residing at East Akron, in the county of Summit and State of Ohio, have invented a new and useful Transmission Mechanism, of which the following is a specification.

The present invention appertains to transmission mechanisms, and it is the object of the invention to provide a novel and improved transmission mechanism whereby a driven element may be rotated in one direction by a driving element in an effective manner, and should the rotation of the driving element be reversed, the driven element will be automatically disconnected therefrom by the use of novel means for this purpose.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings: Figure 1 is an elevation of the mechanism, parts being removed. Fig. 2 is a sectional detail of the mechanism Fig. 3 is an elevation of the stationary disk. Fig. 4 is an enlarged fragmental detail illustrating one of the intermediate gears in operative position. Fig. 5 is a similar view showing the intermediate gear in idle or disconnected position.

In the drawing, there is illustrated a rotatable shaft or axle section 22, constituting the driving element, and having mounted for free rotation upon its spindle or terminal 23, a wheel 3 which is the driven element. The hub 24 of the wheel 3 is journaled loosely upon the spindle 23. Connected to the spokes 25 of the wheel 3 by means of pins 26 is a rotatable disk 27 having the internal gear 29 adjacent which a stationary disk 28 is disposed, to provide with the disk 27 a casing inclosing the gears. The stationary disk 28 is provided with radial slots 30' in which are radially movable pins or studs 30 of intermediate gears 31 which continually mesh with the internal gear 29, and which are adapted to move radially into and out of engagement with a gear wheel 32 carried for rotation by the shaft 22. Springs 36 press the pins 30 inwardly so that the gears 31 normally mesh with the gear wheel 32. The gear wheel 32 is provided at one side with a smooth annular surface 33, and each of the gears 31 is provided at one side with a smooth annular surface 34. Disposed between the annular surfaces 33 and 34 are rollers 35 mounted for rotation upon supports 37 having stems 38 slidable through lugs 39 with which the disk 28 is provided. Springs 40 are disposed between the lugs 39 and supports 37 tending to move the rollers 35 wedgedly between the surfaces 33 and 34, to thereby move the gears 31 outwardly away from the gear wheel 32, but the tension of the springs 36 is normally sufficient to keep the gears 31 in mesh with the gear wheel 32. Thus when the gear wheel 32 is rotated counter-clockwise as seen in Fig. 4, the gears 31 are rotated by the gear wheel 32, and in turn rotate the internal gear 29 and wheel 3, the movement of the surfaces 33 and 34 tending to move the rollers 35 away from between the gears 31 and gear wheel 32. However, should the direction of rotation of the gear wheel 32 be reversed, the rollers 35 will be moved wedgedly between the surfaces 34 and 33 of the gears 31 and gear wheel 32, respectively, thereby forcing the gears 31 outwardly, as seen in Fig. 5, to break the connection between the driving and driven elements.

What is claimed is:

A transmission mechanism embodying a driving element, a driven element, a gear wheel operated by the driving element, an internal gear connected to the driven element, a stationary member, a gear continually meshing with the internal gear and mounted upon the stationary member for radial movement into and out of engagement with the gear wheel, said radially movable gear and gear wheel having annular surfaces, and a spring pressed roller adapted to move wedgedly between said surfaces.

In testimony that I claim the foregoing as my own, I have hereto affixed my signature in the presence of two witnesses.

HARRY A. COVEY.

Witnesses:
W. W. STEVENSON,
D. I. ELDER.

Copies of this patent may be obtained for five cents each, by addressing the "Commissioner of Patents, Washington, D. C."